United States Patent
Banasky Jr. et al.

(10) Patent No.: US 9,125,020 B2
(45) Date of Patent: Sep. 1, 2015

(54) ROAD TRIP VEHICLE TO VEHICLE COMMUNICATION SYSTEM

(71) Applicant: FORD GLOBAL TECHNOLOGIES, LLC, Dearborn, MI (US)

(72) Inventors: Lawrence Banasky Jr., Livonia, MI (US); Thomas Joseph Hermann, Troy, MI (US); Mark Wisnewski, Stockbridge, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 66 days.

(21) Appl. No.: 14/030,293

(22) Filed: Sep. 18, 2013

(65) Prior Publication Data

US 2015/0081157 A1    Mar. 19, 2015

(51) Int. Cl.
  *H04W 4/04* (2009.01)
  *G01C 21/26* (2006.01)
  *G07C 5/08* (2006.01)

(52) U.S. Cl.
  CPC ............... *H04W 4/04* (2013.01); *G01C 21/26* (2013.01); *G07C 5/08* (2013.01)

(58) Field of Classification Search
  CPC ............ H04W 4/04; G01C 21/26; G07C 5/08
  USPC .......................................... 701/29.1, 29, 482
  See application file for complete search history.

(56) References Cited

U.S. PATENT DOCUMENTS

| | | | |
|---|---|---|---|
| 6,445,308 B1 | 9/2002 | Koike | |
| 6,856,892 B2 * | 2/2005 | Oda et al. | 701/537 |
| 6,868,333 B2 * | 3/2005 | Melen | 701/482 |
| 6,898,432 B1 | 5/2005 | Jiang | |
| 7,292,935 B2 * | 11/2007 | Yoon | 701/410 |
| 7,363,117 B2 * | 4/2008 | Tengler et al. | 701/1 |
| 7,526,103 B2 * | 4/2009 | Schofield et al. | 382/104 |
| 8,269,652 B2 | 9/2012 | Seder et al. | |
| 8,307,037 B2 | 11/2012 | Bain et al. | |
| 2011/0118967 A1 | 5/2011 | Tsuda | |
| 2011/0276220 A1 | 11/2011 | Sato | |
| 2013/0024060 A1 | 1/2013 | Sukkarie et al. | |
| 2013/0080345 A1 | 3/2013 | Rassi | |
| 2014/0302774 A1 * | 10/2014 | Burke et al. | 455/3.05 |

FOREIGN PATENT DOCUMENTS

EP    2555583 A2    2/2013

* cited by examiner

*Primary Examiner* — Mary Cheung
*Assistant Examiner* — Michael Berns
(74) *Attorney, Agent, or Firm* — Frank MacKenzie Brooks Kushman P.C.

(57) ABSTRACT

A method of coordinating a plurality of road vehicles includes obtaining information related to a first vehicle that is relevant to a road trip with which the first vehicle and at least a second vehicle are involved, uploading the information to a server wirelessly, and downloading the information from the server wirelessly to at least one of the first vehicle and the second vehicle.

19 Claims, 5 Drawing Sheets

ROAD TRIP VEHICLE TO VEHICLE COMMUNICATION SYSTEM

BACKGROUND

It is common for a number of vehicles to travel in a group to a common destination. Often, the vehicles travel in a tight group in a convoy type of arrangement. However, by design or depending on circumstances, the vehicles may be separate from one another and vehicles can be many kilometers apart, while nevertheless maintaining status as a group during a "road trip". In one example, vehicles may start from various widespread locations and may not necessarily meet before beginning on the road trip. In another example, vehicles may camp or hotel overnight in different locations or, regardless, may depart from their morning location at different times. Thus, during a road trip, for any number of reasons vehicles may be traveling apart from one another, while generally remaining a group with a common destination in mind and seeking to have a common road trip experience.

However, communication between the occupants of the vehicles can be challenging because occupants may have to call or send text messages by cell phone amongst individuals within the vehicles. Such communications can sometimes be difficult to maintain because it may not be convenient for all in the group to remain in communication. Some may not have cell phones, and the driver may not desire to talk on the phone while driving for safety purposes.

Thus, it is desirable to improve communication between multiple vehicles to obtain an improved road trip experience when traveling with two more vehicles in a group.

SUMMARY

A method of coordinating a plurality of road vehicles includes obtaining information related to a first vehicle that is relevant to a road trip with which the first vehicle and at least a second vehicle are involved, uploading the information to a server wirelessly, and downloading the information from the server wirelessly to at least one of the first vehicle and the second vehicle.

A system for communicating, comprising a communication device positioned in a first road vehicle and configured to obtain information related to the first vehicle that is relevant to a road trip with which the first vehicle and a second vehicle are involved, wirelessly upload the information to a server, and wirelessly download the information from the server to at least one of the first vehicle and the second vehicle.

A non-transitory computer-readable medium tangibly embodying computer-executable instructions that cause the computer to obtain information related to a first vehicle that is relevant to a road trip with which the first vehicle and at least a second vehicle are involved, upload the information to a server wirelessly, and download the information from the server wirelessly to at least one of the first vehicle and the second vehicle.

DETAILED DESCRIPTION

The illustrative embodiments include improved communication between multiple vehicles to obtain an improved road trip experience when traveling with two or more vehicles in a group.

Figure 1:
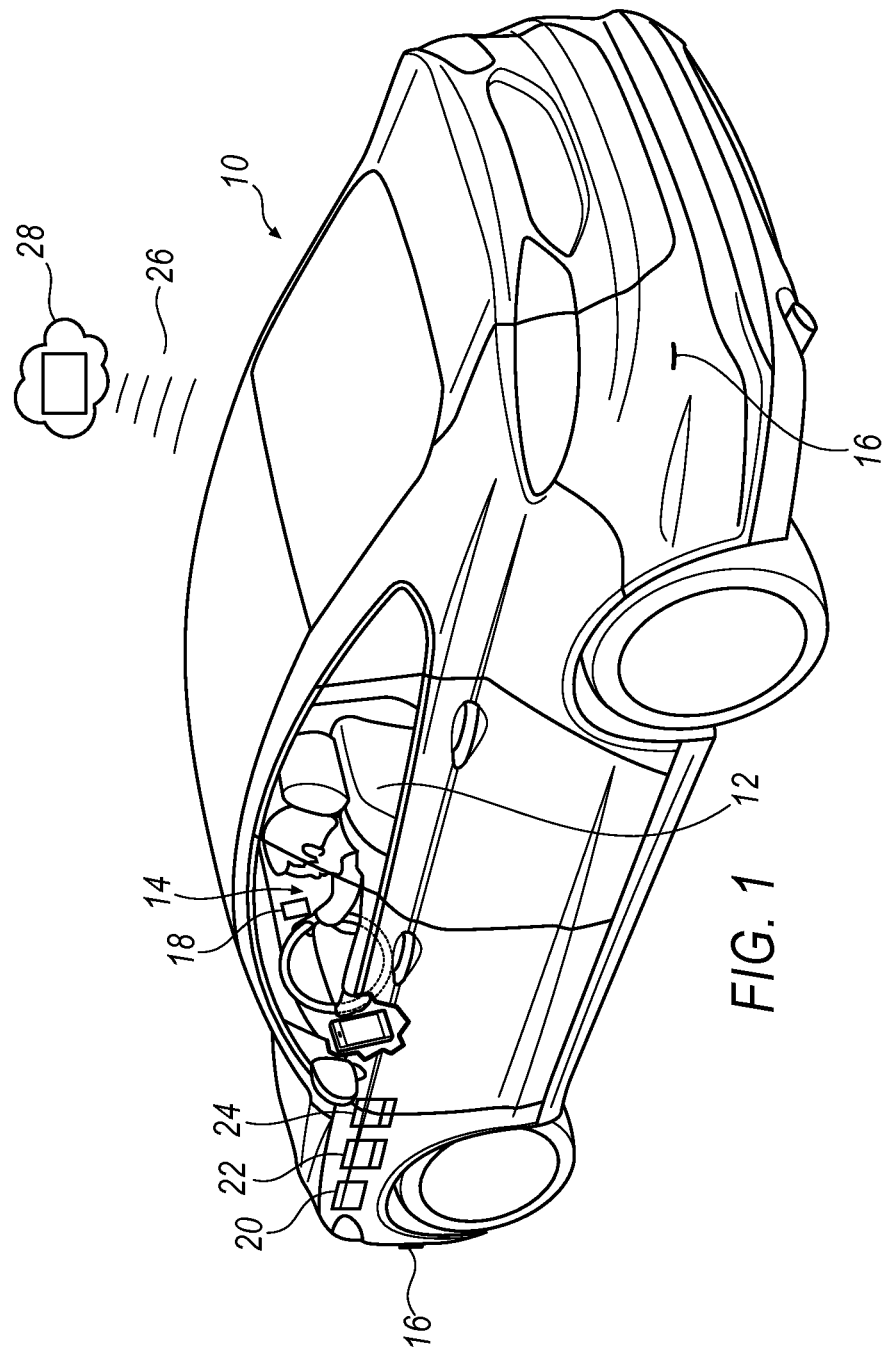
FIG. 1 illustrates a vehicle that includes features that are incorporated into the disclosed system and method.

FIG. 1 shows a vehicle 10 having features that are incorporated into the disclosed system and method. Vehicle 10 is illustrated as a typical 4-door sedan, but may be any vehicle for driving on a road, such as a compact car, a pickup truck, or a semi-trailer truck, as examples. Vehicle 10 includes a seat 12 for positioning a driver. Vehicle 10 includes a dashboard 14 that typically includes control buttons or switches for activating various devices on vehicle 10. A steering wheel is positioned such that the driver can steer vehicle 10 while driving.

Vehicle 10 includes a number of features, which include but are not limited to an airbag system, various sensors 16 throughout vehicle 10, an audio/visual system 18, a GPS 20, and a communication system 22 that includes but is not limited to a WiFi system, an embedded modem, and a dedicated short-range communication (DSRC) system. A DSRC uses one-way or two-way short- to medium-range wireless communication channels specifically designed for automotive use and a corresponding set of protocols and standards. A computer or computing device 24 is positioned within vehicle 10, which provides any number of features that include controlling engine and other vehicle parameters, monitoring vehicle operation (safety devices, tire pressure, etc.), interfacing with the driver via the audio/visual system 18, monitoring vehicle position via GPS 20, providing map and directions to the driver using GPS information, to name a few. The audio and/or visual device 18 may provide warning to a driver or other occupant of a car of a hazard, for instance, may inform the driver of driving instructions, or may provide other features. In addition, display may be in the cluster of each vehicle, on smartphones, or as a heads-up display.

Communication system 22 is configured to operate wirelessly with systems external to vehicle 10. In one embodiment, signals are sent wirelessly 26 external to the vehicle, such as to a "cloud computing" device or collection of computers or computing devices 28, generally referred to as server 28. Signals may also be sent from communication system 22 via the WiFi system, the embedded modem, or DSRC to other devices external to the vehicle.

Figure 2:
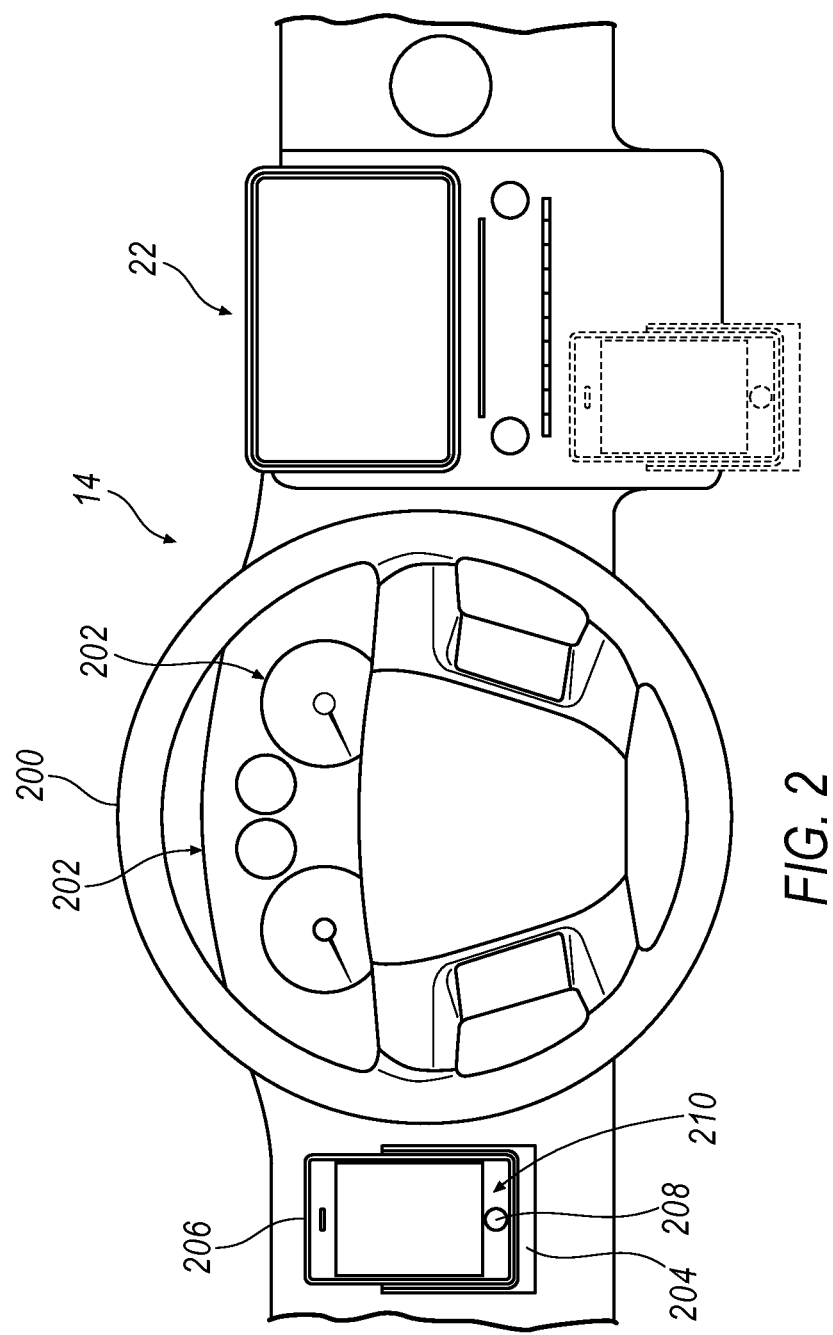
FIG. 2 illustrates a dashboard of a vehicle.

Referring to FIG. 2, dashboard 14 includes a steering wheel 200 and instruments 202 that display vehicle speed, engine speed (e.g., in a tachometer), and the like. Dashboard 14 includes a holder 204 to which a cellphone or cellular telephone 206 is attached. Holder 204 includes any device for holding cellphone 206, such as a clamping device, Velcro, or a device with slots into which cellphone 206 slides, as examples. In an alternative embodiment, holder 204 is not provided and cellphone 206 may be simply placed in the vehicle next to the driver.

In addition to conventional cellphone communication capability (e.g., for telephone calls), cellphone 206 includes a wireless communication device such as Bluetooth or other known methods for communicating with a local device such as computing device 24 of vehicle 10. Such may be useful for sending music or other information for use on a sound system of vehicle 10, or for communicating with a safety system of vehicle 10, as examples.

Cellphone 206, in one embodiment, is a "smartphone" that is capable of executing software applications, or "apps" that interact with the internet via a touchscreen or other known methods. Cellphone 206 includes a camera 208 and at least one of a keypad and display. As such, a driver or other occupant of the vehicle may communicate wirelessly with computers that are external to the vehicle using computing device 24 and interfacing therewith by using an "app" on cellphone 206, and/or by using audio/visual system 18. Such communication may be with an icon-driven touchscreen, voice-recognition, or by using a text feature, as examples. Communication may be via computing device 24 to computing devices 28 or to another computer, such as a computer at an automobile dealership.

That is, an occupant of a vehicle may communicate with computers external to the vehicle via any number of means, including but not limited to a cell phone and/or via a communication system that is part of the vehicle and may be incorporated into a dashboard thereof. Communication is wireless and two-way and may include cloud computing devices and/or a computer device affiliated with a business or industry.

Figure 3:
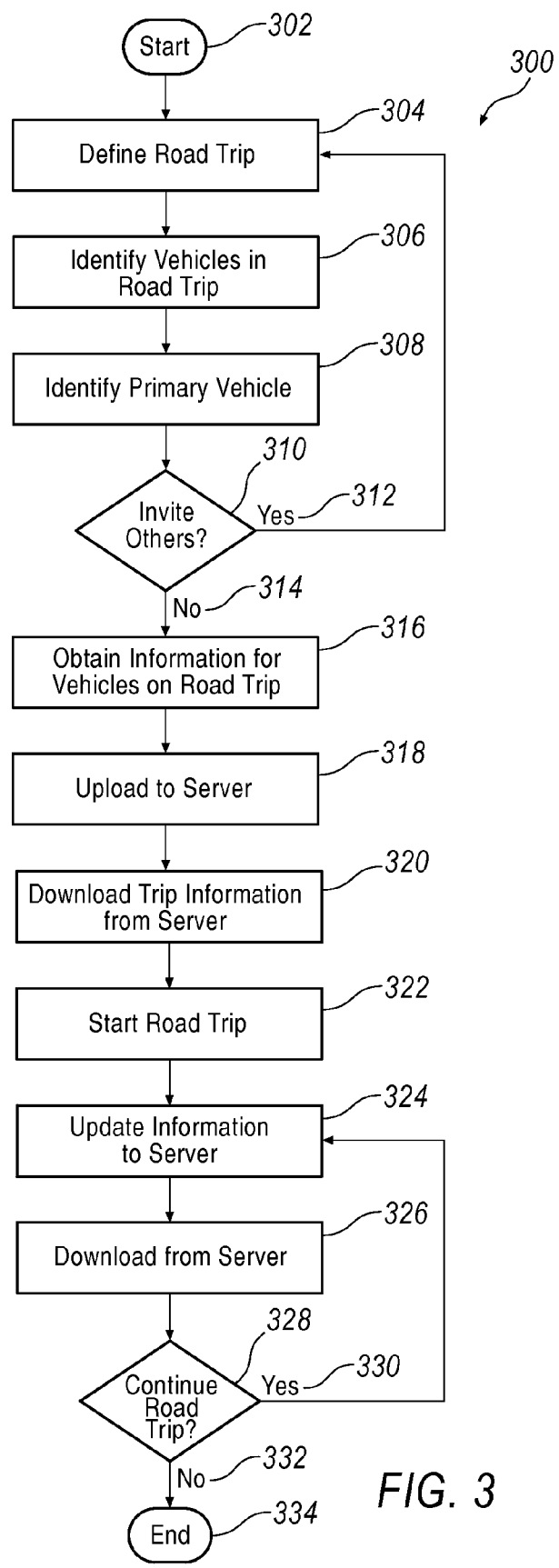
FIG. 3 illustrates a method of the steps of setting up and taking a road trip, according to one embodiment.

Referring to FIG. 3, a method of coordinating a plurality of road vehicles 300 is disclosed that illustrates the steps of setting up and taking a road trip, according to one embodiment. Starting at step 302, at step 304, the road trip is defined by any current participants in the road trip, which occurs during a planning stage of the road trip. Such planning may occur in realtime just before the trip begins, or may occur days, weeks, or more, in advance of the trip. Such planning may be via an "app" on a smart phone, or may be via a communication system in one of the road trip vehicles, such as communication system 22 of vehicle 10. Parameters of the road trip may thereby be entered using one or more smart phones, or audio/visual system 18, or a combination thereof. The details of the road trip may thereby be stored in computing device 24, or may be uploaded wirelessly 26 to server 28. The trip may be planned over an extended period of time, during which partial elements of the trip (i.e., destination, time of departure, direction of travel, places of interest to see, etc.) may be entered and stored during development of details of the road trip. A digital map may thereby be provided to each vehicle from their beginning location to an end location, once the trip gets underway. Thus, the road trip is defined as an overland trip for the vehicles to travel to a common destination.

After, or concurrently with step 304, vehicles are identified that will be participating in the road trip. For instance, in one example, two individuals may plan the trip in one location, but one of the individuals may be using a different vehicle than is currently present. In addition, one or more additional vehicles may be planned to be involved in the road trip. Thus, in step 306, the vehicles of the road trip are identified and accessed through a networked system of computers, such as wirelessly 26 to server 28. Once the vehicles are identified, according to one embodiment, a lead or primary vehicle may be identified at step 308. Step 308 may or may not be necessary, depending on the type of road trip planned. For instance, in one embodiment, a "command vehicle" may be identified as the lead or primary vehicle, while the other vehicles are not, which may enable a more restricted access to the parameters of the road trip to better coordinate the group activities. Such would allow a single vehicle the ability to take the lead, establish parameters, ensure smooth operation during the road trip, delete a vehicle from the road trip, and the like. However, in another embodiment, no lead vehicle is identified, in which case all participants in the road trip are able to upload road trip information, alter road trip plans (i.e., next rest stop, next restaurant, etc.) and likewise download the relevant road trip information as well, in realtime and as it is updated on the server 28.

After the road trip is defined 304, vehicles are identified 306, and the primary vehicle 308 is optionally identified, at step 310, it may be necessary or desirable to invite others on the road trip as well. Such invitations may be sent from vehicle to vehicle using in-vehicle communications systems, may be sent via the app(s) on the cellphone (such as to others not yet in a vehicle, such as traveling on foot or by bicycle), or a combination thereof. Such invitations may be desirable to send to inform others of the impending road trip, or may be desirable to entice a potential participant who is "on the fence" and unsure whether to attend the road trip or not. As such, parameters sent in the invitation may include the defined parameters of the road trip (destination, departure and arrival dates, etc.), other participants, and additional commentary that may be included particular to the invitation. Thus, if additional invitation(s) are sent 312, and are accepted, it may be of interest to reconsider the defined road trip 304, any additional vehicles 306, and an alternative primary vehicle 308. As such, information may be uploaded that is related to a road trip participant that is not yet part of the road trip and to a communication system that is not within a road trip vehicle that is associated with the road trip. Communication to the vehicle not yet part of the road trip may thereby be to inform a new participant of where to meet one of the vehicles of the road trip so that the participant can join the road trip. Or, a new participant may simply be added to the road trip, and instruction begins such that the new participant is directed to a destination for the end of the day, and ultimately to the final road trip destination.

Once no further invitations are sent out 314, and prior to beginning the road trip, information pertaining to each of the vehicles is obtained, at step 316, which is relevant to the road trip with which the vehicles are involved. Such may include identity of the participants in respective vehicles, beginning location, planned start time when they can get on the road, and the like. The identification of people in the trip can be accomplished by manual registration or assisted by facial recognition, near field communication, Bluetooth, GPS, cell phone (such as via camera 208 of cellphone 206), or other sensing strategies.

Such information is uploaded to the server 28 at step 318, and may be made available to only participants of the road trip, or may be made available to others who are interested in the road trip but are unable to participate. The uploaded information is downloaded from the server 28 at step 320. As such, participants of the road trip in all road trip vehicles may be made aware of the current status, plans, etc., of the other vehicles as the trip gets underway.

The road trip starts at step 322, during which time information may be continually uploaded 324 to the server 28 in realtime, to update other participants in the road trip as the road trip unfolds. As the server 28 is updated at step 324, the updated information is available for download by other participants at step 326, generally occurring automatically and without human intervention. The process continues 328 and, if more information is added 330 during the road trip, it is again uploaded at step 324 and downloaded at step 326. The process of uploading and downloading continues during the duration of the road trip, which may continue through days or weeks of the road trip, spanning overnight stays, restaurant stops, rest breaks, and the like. The method ends 334 when the road trip is discontinued 332, typically when arriving at the end destination, or if the road trip is discontinued for other reasons.

Figure 4:
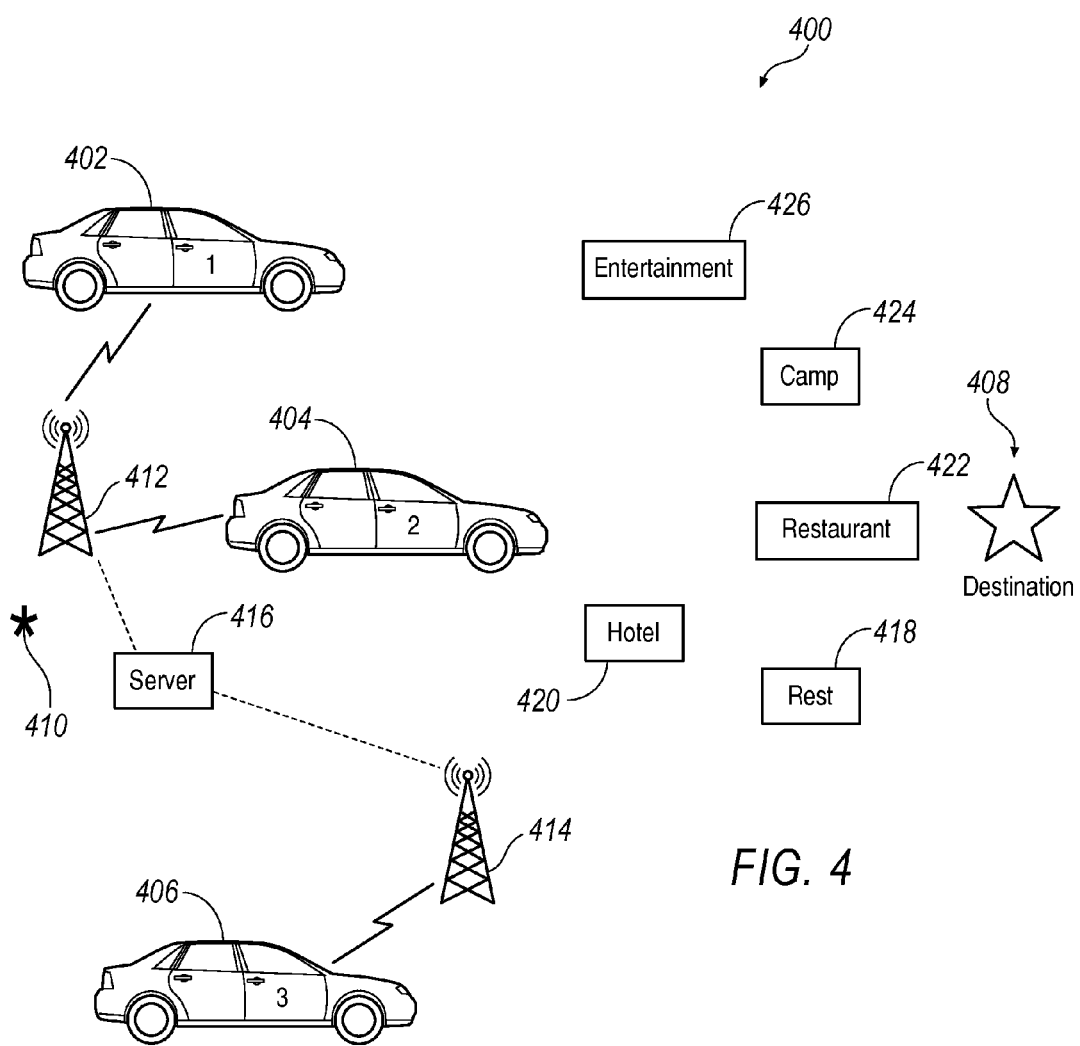
FIG. 4 illustrates a symbolic layout of a road trip, according to one embodiment.

FIG. 4 illustrates a symbolic road trip 400. Road trip 400 shows a first vehicle 402, a second vehicle 404, and a third vehicle 406 on the way to a final destination 408. And, although three vehicles 402-406 are shown, it is contemplated that any number of vehicles may participate in road trip 400.

Vehicles 402-406 are coordinated and participate in road trip 400 consistent with the method 300 above. According to one embodiment, a common starting location 410 may be shown. However, it is contemplated that some or all of vehicles 402-406 may start at separate starting locations (not shown), and coordination from the start of road trip 400 is conducted based on the separate starting locations. Vehicles 402-406 are directed to travel to destination 408, having any number of stopping locations along the way. As stated in method 300, communication to and from each vehicle, in one embodiment, is via a wireless communication to one or more cellphone towers 412, 414. That is, communication is via a communication device such as system 22 of vehicle 10, and may be to the nearest cell tower. Communication from cell towers 412, 414 is further sent to a server 416, which, in one embodiment, corresponds to cloud computing devices or server 28 described above. Road trip 400 occurs or unfolds over time as vehicles 402-406 coordinate their activity, during which time some or all of vehicles 402-406 may seek to meet at locations such as rest stops 418, hotels 420, restaurants 422, campgrounds 424, and entertainment locations 426 along the way to destination 408. In fact, locations 418-426 are merely representative of a few types of locations that may be part of road trip 400, and any sort of location may be part of the road trip 400, such as tourist destinations, friends' houses, businesses, etc.

According to one embodiment, vehicles may travel in separate clusters during the road trip. For instance, in this embodiment vehicles 1 and 2 (402, 404) may be traveling as a group and within a relative close proximity to one another, such as 0.5 miles. Thus, this cluster of vehicles 1 and 2 may travel during a portion of the road trip and relatively separated from other vehicles in the road trip, such as vehicle 3 (406). There may be any number of vehicles in the road trip, thus it is contemplated that any number of clusters or sub-groups may be formed of vehicles that travel in loose packs and near each other. It is further contemplated that the separate clusters may also travel generally separated from each other, even staying the night or attending other events from each other, while maintaining their status as a "road trip", having a common destination and also a common form of communication via server 416 in which a single road trip is carried out. In such fashion, the clusters can travel separate from one another, yet vehicles all part of the road trip may view what other clusters are doing, while traveling in their own respective cluster for some or even all of the road trip. Further, individual travelers may move from one cluster of travelers to another cluster of travelers in the road trip. For example, if when stopping at a rest area, a child wants to move from mom and dad's vehicle to grandma and grandpa's vehicle, then the traveler moving to the other vehicle may be tracked, accordingly, and moved to the new vehicle.

In addition, the system may identify open seats based on the make and model of vehicle, the present number of people in that vehicle, and manual indication of seats available (i.e., if there is luggage taking up one or more seats). If open seats or additional space is identified, then occupants may desire to move themselves and/or their luggage to another vehicle. Further, the system provides the ability for each person in the road trip to manually identify preferences or allow the system to glean traveler preferences based on other methods, such as social media accounts (i.e., FACEBOOK, etc.). In such fashion, social media sites may be tied to the road trip such that others in the road trip can access preferences and other road trip information from a social media site that, in one embodiment, is linked to the road trip and, therefore, accessible via the social media site. As the road trip progresses, a strategy based on votes and user preferences of all individuals in the road trip may be employed to determine restaurant, hotel, route, playlist, etc. with the trip lead arbitrating. In such fashion, a cluster, or many or all vehicles, may participate in a decision to stop for a rest, food, etc.

The system includes, in one embodiment, an ability to automatically recommend or schedule hotel, restaurant, route, playlists, etc. based on trip factors, participant preferences, or other information such as a specific time, maximum distance from the route, fuel consumption number of participants, specific restaurant, specific hotel type, weather, traffic conditions, fuel level, miles per gallon, information from social media services such as FACEBOOK, information from travel services such as TRIP ADVISOR, information from music services such as PANDORA, etc.

As such, road trip 400 is illustrated having blocks that illustrate a rest stop, a hotel, a restaurant, a campground, and an entertainment location. However, it is contemplated that any number of such facilities may be encountered along the way to destination 408. Further, although not shown, road trip 400 may include a map overlay to show vehicle positions on roads and highways. In one embodiment, the icons shown for vehicles 402-406 and locations 418-426 are much smaller and overlaid on a map having highways and roads, with moving icons on the map that show other participants in the road trip where the other vehicles are in realtime.

FIGS. 5A-E show graphic illustrations of the types of information that may be displayed within vehicles on audio/visual system 18 and/or on smartphone devices or cellphones 206 that are participating in road trip 400, according to embodiments.

Figure 5A:
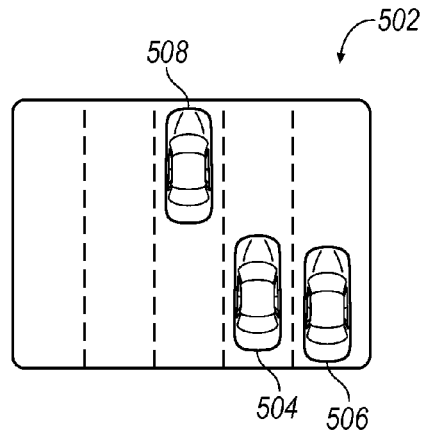
FIG. 5A illustrates a plan view of vehicles participating in a road trip, according to one embodiment.

For instance, FIG. 5A shows a plan view 502 of vehicles on a roadway. In this embodiment, vehicle 504 is shown that corresponds to one of vehicles 402-406, having other vehicles 506, 508 proximate thereto that are sensed from vehicle 504 using sensors such as sensors 16 or other cameras that may be positioned, such as on vehicle 10. In one example, vehicle 504 may be detected as being too close to vehicle 504, in which an alert (audio or visual, not shown) may be presented to road trip participants. Thus, information may be obtained using an object detection sensor that is attached to a vehicle, and such information may be overlaid on a digital image of the vehicle or vehicles being displayed.

Figure 5D:
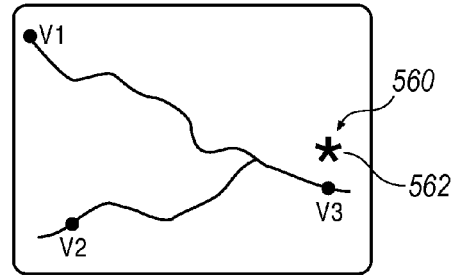
FIG. 5D shows a map of current locations of vehicles, according to one embodiment.
Figure 5B:
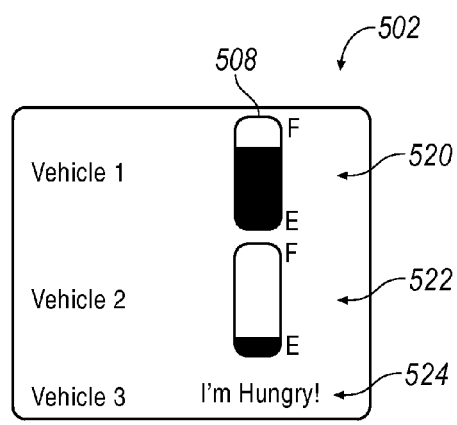
FIG. 5B illustrates a status of vehicles participating in a road trip, according to one embodiment.

FIG. 5B illustrates status of the vehicles, such as fuel levels 520, 522 or a text message 524 that is submitted in vehicle 3 (406). In one example, health of the vehicles may be displayed that may include an operating temperature of the vehicle, a trouble code of the vehicle, or an output of a flat tire sensor, as examples. If fuel is low, such as shown for vehicle 2 (522), an audio or visual warning may be presented to road trip participants. Information displayed may be related to a rest stop, information related to a restaurant, information related to a new destination for the day, information related to sleeping accommodations, and a text message, as examples.

Figure 5E:
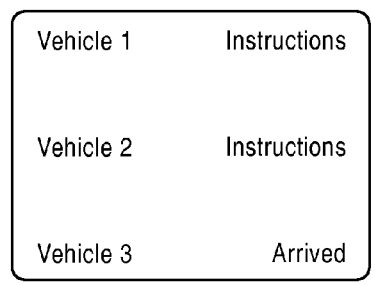
FIG. 5E shows instructions for each vehicle to follow to arrive at the next destination, according to one embodiment.
Figure 5C:
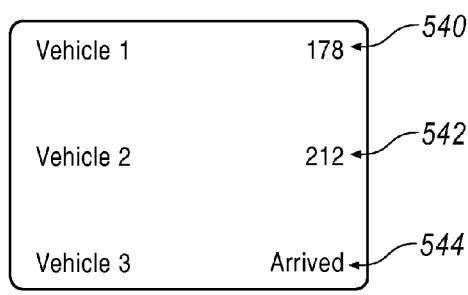
FIG. 5C shows current distance remaining for the three vehicles to the next destination of interest, according to one embodiment.

FIG. 5C shows current distance remaining for the three vehicles 540, 542, 544 to the next destination of interest. For instance, if the vehicles are traveling to the next destination for the day, which may be a hotel or campground, then distance left before arrival for each vehicle may be displayed to road trip participants. Such may be presented in miles or kilometers, or may instead be a time estimate for each vehicle to the next destination based on current location, roads to travel over, and the like. In one embodiment, such distances may alternatively be displayed as the total remaining distance to the final destination 408, which may be days or weeks from arrival.

FIG. 5D shows a map 560 of current locations of vehicles V1, V2, and V3 and may include navigational information for each vehicle (such as location). In this illustration, V3 has arrived at destination 562, but vehicles V1 and V2 still have distance to travel before reaching destination 562. In one example, the navigational information includes at least one of GPS coordinates of a vehicle, and/or a speed of the first vehicle. In one embodiment, map 560 may include views of clusters of vehicles. For instance, on the navigation screen, the total number of people in each cluster could be displayed on top of the cluster or vehicle icon. The information provided can change based on the zoom level of the navigation screen. For example, if there are multiple vehicles leaving from multiple cities, the view of all travelers can span many miles. The screen may only show a single icon for multiple vehicles and indicate the total number of vehicles and travelers in that cluster of travelers. A user may choose to zoom in and only view the vehicles in close proximity to their vehicle. In this case, each vehicle can show the number or names of travelers in those vehicles. An information page can be accessed that shows the names and a profile picture or avatar of those traveling in each cluster or vehicle.

FIG. 5E includes instructions for each vehicle to follow to arrive at the next destination, such as destination 562 of FIG. 5D. Instructions are unique to each vehicle and may include distance information on each road, turn information, and the like, to guide the driver to destination 562 with audio or visual instructions. In the illustrated example of FIG. 5E, vehicle 3 is shown as having arrived.

FIGS. 5A-5E illustrate examples of road trip information that may be displayed to the road trip participants. The information for each vehicle is uploaded to the server, and then downloaded therefrom to the other road trip participants. As such, the road trip 400 is coordinated in such fashion that all vehicles are informed by having the ability to toggle through the various and exemplary screen display options.

In one embodiment, method 300 may be implemented using a hands-free operation using a factory-installed, integrated in-vehicle communications and entertainment system that allows users to make hands-free telephone calls, control music, and perform other functions with the use of voice commands. The system may include applications and user interfaces that are developed in an originally manufactured vehicle and integrated into controller 24, or may be an aftermarket device.

Thus, disclosed is a system for allowing multiple vehicles that are being used on a road trip to communicate with each other in realtime. The system pulls information from the vehicle and coordinates that information through online communication systems. The communication system sends the information out on a regular cadence through a cellular connection to a server. The server sends this information out as a broadcast to each of the other vehicles identified on the trip. The information important for the functionality of this system includes, but is not limited to Navigation: GPS Coordinates, Speed; Object Detection: Camera, Object Detection Sensors; Vehicle Health: Fuel Level, Temperature, Trouble Codes; Communications: Vehicle operator or passenger communications to one or all of the other vehicles on the trip. For example, rest, eat, new destination, etc. may be displayed between vehicles.

The Navigation system could incorporate the GPS coordinates, speed, and object detection information from each vehicle and show all vehicles on the same map with object detection warnings from each vehicle. In one example, there is a vehicle health screen that shows fuel levels and warnings from each vehicle on the trip. In another example, there is a section of the screen that displays messages sent from each vehicle. In such fashion, there can be a common notification to all vehicles on the trip. For example, if there is a group of friends that are going on a trip from Michigan to Florida, and all of the vehicles are involved in the road trip, the vehicles can synchronize prior to the trip. The lead vehicle can be specified or automatically identified as the front vehicle on the trip. A range can be specified or automatically enabled, and when a vehicle gets outside of that range, a prompt or notification may be sent (i.e. if the lead vehicle is driving too fast and leaves other vehicles too far behind). If one of the vehicles in the trip has low fuel, all of the vehicles can be notified and the navigation system can automatically route to the nearest gas stations. If one of the vehicles has a flat tire or other failure, all of the vehicles can be notified or rerouted to the nearest repair shop.

Hotel recommendations can be provided. There can be an opportunity to delete a trip member if that vehicle needs to go to a new destination. The navigation system can show all of the vehicles on the same map screen with warnings from each vehicle's object detection sensors/cameras, which allows for a mapping of nearby traffic that can actually better warn other vehicles on the trip. If someone on the trip needs to use the restroom or stop for food, they can raise a flag and notify all other vehicles on the trip. In one embodiment, and in an environment where vehicles may be remotely driven or automatically driven without human intervention, the system can allow for a trip lead vehicle to drive the other vehicles so that the other vehicle operators can go on auto pilot.

Computing devices, such as the controller, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, JAVA, C, C++, VISUAL BASIC, JAVA SCRIPT, PERL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer-readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, the use of the words "first," "second," etc. may be interchangeable.

What is claimed is:

1. A method comprising:
    obtaining road trip information related to a first vehicle of a plurality of vehicles of a road trip;
    uploading the road trip information to a server external to the vehicles for downloading by the vehicles; and
    uploading invitation information to the server related to a road trip participant not yet part of the road trip to inform the participant where to meet one of the vehicles to join the road trip.

2. The method of claim 1, wherein the step of obtaining information comprises obtaining navigational information, wherein the navigational information includes at least one of GPS coordinates of the first vehicle, and a speed of the first vehicle, and wherein the method further comprises displaying the navigational information on a map in at least one of the first vehicle and a second vehicle of the plurality of vehicles.

3. The method of claim 1, wherein the step of obtaining information comprises obtaining information related to vehicle health, wherein the information related to the vehicle health includes one of a fuel level of the first vehicle, an operating temperature of the first vehicle, a trouble code of the first vehicle, and an output of a flat tire sensor.

4. The method of claim 1, further comprising wirelessly communicating between the first vehicle and a second vehicle of the plurality of vehicles by the steps of:
    uploading a communication from the first vehicle wirelessly to the server; and
    downloading the communication to the second vehicle wirelessly from the server.

5. The method of claim 4, wherein the communication comprises one of information related to a rest stop, information related to a restaurant, information related to a new destination, information related to sleeping accommodations, and a text message.

6. The method of claim 1, wherein the step of obtaining information comprises obtaining a digital image using an object detection sensor that is attached to the first vehicle, and wherein the step of uploading includes uploading the digital image to the server.

7. The method of claim 1, further comprising synchronizing the vehicles prior to beginning the road trip by the steps of:
    identifying one of the plurality of vehicles as a primary vehicle;
    providing a digital map to each vehicle from their beginning location to an end location; and
    enabling the primary vehicle to delete a vehicle from the road trip.

8. The method of claim 1, further comprising defining the road trip as an overland trip by at least the first vehicle and a second vehicle to a common destination.

9. A system, comprising:
    a communication device, positioned in a first road vehicle of a plurality of vehicles, configured to:
        obtain road trip information related to the first vehicle that is relevant to a road trip with which the first vehicle and a second vehicle of the plurality of vehicles are involved;
        upload the information to a server external to the plurality of vehicles, the server configured to make the information available for download to at least one of the first vehicle and the second vehicle; and
        upload invitation information related to a road trip participant that is not yet part of the road trip to the server, to cause the server to inform the road trip participant of where to meet one of the vehicles of the road trip so that the participant can join the road trip.

10. The system of claim 9, wherein the system is further configured to:
    upload a communication from the first vehicle wirelessly to the server; and download the communication to the second vehicle wirelessly from the server.

11. The system of claim 10, wherein the communication comprises one of information related to a rest stop, information related to a restaurant, information related to a new destination, information related to sleeping accommodations, and a text message.

12. The system of claim 9, wherein the system is configured to obtain the information as a digital image and with an object detection sensor that is attached to the first vehicle, and wherein the system is configured to upload the digital image to the server.

13. A non-transitory computer-readable medium tangibly embodying computer-executable instructions that, when executing by a computer, cause the computer to:
  obtain road trip information related to a first vehicle of a plurality of vehicles that is relevant to a road trip with which the first vehicle and at least a second vehicle of the plurality of vehicles are involved;
  upload the road trip information to a server external to the vehicles to make the road trip information available for download from the server to at least one of the first vehicle and the second vehicle; and
  upload invitation information related to a road trip participant that is not yet part of the road trip to the server, to cause the server to inform the road trip participant of where to meet one of the vehicles of the road trip so that the participant can join the road trip.

14. The non-transitory computer-readable medium of claim 13, wherein the computer is further caused to obtain the information as navigational information, wherein the navigational information includes at least one of GPS coordinates of the first vehicle, and a speed of the first vehicle, and wherein the computer is further caused to display the navigational information on a map in at least one of the first vehicle and the second vehicle.

15. The non-transitory computer-readable medium of claim 13, wherein the computer is further caused to obtain the information as information related to vehicle health, wherein the information related to the vehicle health includes one of a fuel level of the first vehicle, an operating temperature of the first vehicle, a trouble code of the first vehicle, and an output of a flat tire sensor.

16. The non-transitory computer-readable medium of claim 13, wherein the computer is further caused to wirelessly communicate between the first and second vehicles by being caused to:
  upload a communication from the first vehicle wirelessly to the server; and
  download the communication to the second vehicle wirelessly from the server.

17. The non-transitory computer-readable medium of claim 16, wherein the communication comprises one of information related to a rest stop, information related to a restaurant, information related to a new destination, information related to sleeping accommodations, and a text message.

18. The non-transitory computer-readable medium of claim 13, wherein the computer is further caused to synchronize the vehicles prior to beginning the road trip by being caused to:
  identify one of the first and second vehicles as a lead vehicle,
  provide a digital map to each vehicle from their beginning location to an end location; and
  enable the lead vehicle to delete a vehicle from the road trip.

19. The non-transitory computer-readable medium of claim 13, wherein the computer is further caused to define the road trip as an overland trip by at least the first vehicle and the second vehicle to a common destination;
  wherein the computer is further caused to obtain, upload, and download information automatically and without human intervention.

* * * * *